No. 755,541. PATENTED MAR. 22, 1904.
J. R. PRING.
WHIFFLETREE COUPLING.
APPLICATION FILED NOV. 4, 1903.
NO MODEL.

Witnesses
F. W. Riley
Wm. Koerth

Inventor
John R. Pring.
By Rexford M. Smith
Attorney

No. 755,541. Patented March 22, 1904.

UNITED STATES PATENT OFFICE.

JOHN R. PRING, OF TECUMSEH, OKLAHOMA TERRITORY.

WHIFFLETREE-COUPLING.

SPECIFICATION forming part of Letters Patent No. 755,541, dated March 22, 1904.

Application filed November 4, 1903. Serial No. 179,813. (No model.)

*To all whom it may concern:*

Be it known that I, JOHN R. PRING, a citizen of the United States, residing at Tecumseh, in the county of Pottawatomie and Territory of Oklahoma, have invented a certain new and useful Whiffletree-Coupling, of which the following is a specification, reference being had therein to the accompanying drawings.

This invention relates to whiffletree-couplings, and has for its object to provide means for connecting a swingletree to a doubletree or a doubletree to a pole or tongue, the connection being made without the use of the usual bolts or screws inserted in or passed through the swingletree or doubletree, and thereby weakening said parts to an extent which frequently causes the same to break under the strain applied thereto.

A further object of this invention is to so construct the two parts of the coupling that in order to disconnect the same one member of the coupling must be turned into such relation to the other as to admit of their becoming disengaged. This renders the coupling safe in use and greatly expedites detaching the swingletree from the doubletree and the doubletree from the pole.

A further object is to so construct the coupling members that the swingletree or the doubletree cannot drop forward and downward and will always remain level and operate in parallel planes.

A further object of the invention is to so construct and combine the coupling members that a double or duplex interlocked engagement is established between the same, thereby distributing the strain.

With the above and other objects in view the invention consists in the novel construction, combination, and arrangement of parts, as hereinafter fully described, illustrated, and claimed.

Figure 1:
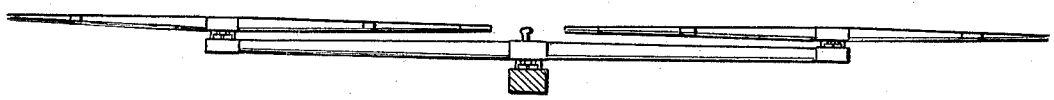
Figure 2:
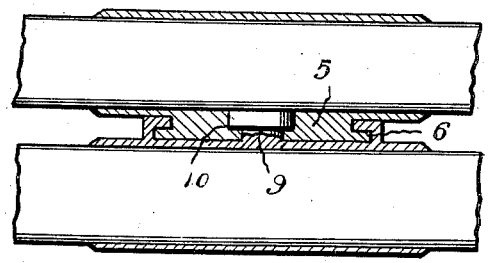
Figure 3:
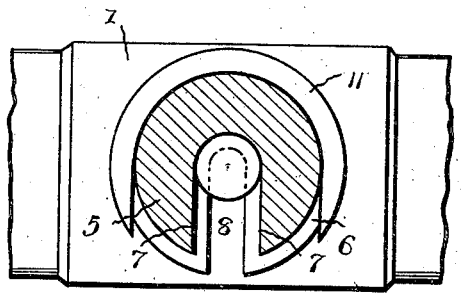
Figure 4:
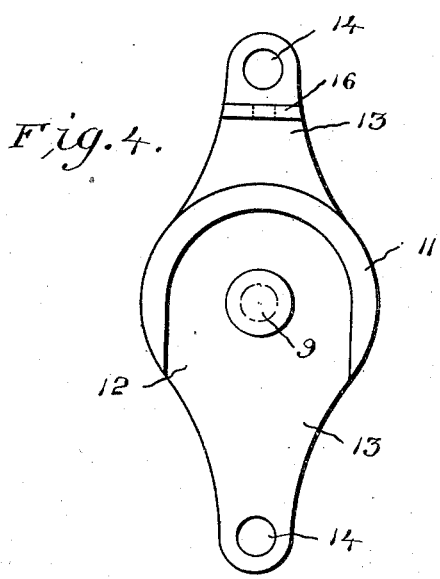
Figure 5:
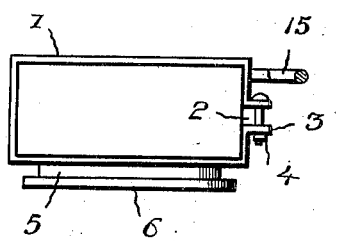

In the accompanying drawings, Figure 1 is a view in elevation of a doubletree and a pair of swingletrees connected by means of the coupling of this invention. Fig. 2 is an enlarged detail section through one of the couplings, showing the manner in which the two members engage and interlock with each other. Fig. 3 is a horizontal section through the same, taken just below the head of the stud and the rabbeted flange. Fig. 4 is a plan view of the lower coupling member especially designed for use in connection with a pole or tongue. Fig. 5 is an end elevation of one of the coupling members.

Like reference-numerals designate corresponding parts in all the figures of the drawings.

Each coupling member comprises a clip 1, which is in the form of a sleeve substantially rectangular in cross-section and corresponding in shape with the swingletree or doubletree which it surrounds. The sleeve-shaped clip 1 is divided along one side, as shown at 2, and provided with ears or flanges 3, extending outwardly therefrom and having openings for the reception of one or more clamping-bolts 4, as illustrated in Fig. 5, whereby the clip may be placed over and firmly secured upon a swingletree or doubletree, as the case may be.

One of the coupling members is provided with a circular boss 5, provided with a circumferential flange 6 and also with a radial slot or opening 7, extending from the outer edge thereof inward past the center, as shown in Fig. 3. The flange 6 or flanges similar thereto are extended along the sides of the slot or recess 7, as shown at 8, said flanges being about the same width and located in the same plane with the flange 6. The other coupling member is provided with a central stud or screw 9, having a flat disk-shaped head 10. This stud is located centrally of the coupling member, while extending around the stud 9 and concentric therewith is a rabbeted flange or rim 11, approximately equal to or slightly greater than a half-circle and having its end portions extended forward to a point about even with the boss 5, as shown in Figs. 3 and 4, so as to admit the flanged boss 5 and allow the same to turn therein when properly inserted.

In assembling the two parts of the clip the clip member bearing the flanged boss 5 is advanced toward the other member, which is provided with a rabbeted flange, in such a way as to cause the slot 7 to embrace the headed stud 9. After bringing the two coupling members together until the headed stud reaches the inner end of the flanged slot 7 one member is turned half-way around until the parts of the coupling are brought into the position illustrated in Fig. 3. The flanges 6 and 8 are thus interlocked with the rabbeted flange 11 and the head of the stud 9, rendering it impossible for the two parts of the coupling to become disconnected until the operation just above described is reversed.

It will thus be seen that the strain is distributed between the rabbeted flange and the headed stud; also, that no bolts, screws, or other fasteners are associated with the wooden body of the swingletree or doubletree which would weaken the same.

To adapt one member of the clip to the tongue or pole of a vehicle, said member may be constructed as shown in Fig. 4, in which the rabbeted flange 11 and the headed stud 9 are formed integrally with the base-plate 12, having oppositely-projecting extensions 13, provided with openings 14 for the reception of bolts whereby said base-plate is secured to the draft pole or tongue.

The part 9 may be either in the form of a stud or screw, or, in other words, the shank portion of the stud may be screw-threaded into the body of the clip, so that by tightening the screw rattling and loosening may be obviated. The manner in which the parts are combined makes it impossible for the swingletree or doubletree to tilt up behind or down before and causes the same to remain level on the tongue and doubletree. 15 designates a loop carried by the clip for the attachment of the usual stay strap or brace. The plate 13 is provided with an upstanding lug or ear, as shown at 16, the said lug being provided with an opening to receive a strap or brace from the center of the doubletree. Such strap or brace may have a threaded connection with the lug 16, so as to take up wear or slack.

The clips or body portions of the coupling members may be varied in shape to suit conditions, and other changes may be made in the form, proportion, and minor details of construction without departing from the principle or sacrificing any of the advantages of the invention.

Having thus described the invention, what is claimed as new is—

1. A whiffletree-coupling consisting of two members each of which is provided with a central headed stud, and a rabbeted flange concentric therewith, the other member being provided with a circular boss having a circumferential flange to engage said rabbeted flange, and a slot with flanges extending along opposite sides thereof and adapted to engage beneath the head of said stud.

2. A whiffletree-coupling comprising two members one of which is in the form of a sleeve or clip adapted to embrace the whiffletree, said clip being divided at one side only and provided with means for clamping the same upon the doubletree, the two members being provided with interlocking means located directly between the trees, substantially as described.

3. A whiffletree-coupling comprising two members, one of which is in the form of a sleeve or clip adapted to embrace a doubletree and having means for clamping the same around the doubletree, the two members being provided with interlocking flanges, and an interlocking headed stud and radial slot therefor, substantially as described.

In testimony whereof I affix my signature in presence of two witnesses.

JOHN R. PRING.

Witnesses:
N. SEWELL,
JAMES R. BASS.